G. WILSON & G. H. BAISLEY.
Earth-Boring Machines.

No. 141,097.       Patented July 22, 1873.

WITNESSES.
W. R. Duhamel
Alex Davidson

INVENTOR.
Geo. Wilson.
Geo. H. Baisley
Per H. S. Abbot.
attorney.

UNITED STATES PATENT OFFICE.

GEORGE WILSON AND GEORGE H. BAISLEY, OF HAMILTON, MISSOURI; SAID BAISLEY ASSIGNOR TO ISAAC N. SPLAWN.

IMPROVEMENT IN EARTH-BORING MACHINES.

Specification forming part of Letters Patent No. 141,097, dated July 22, 1873; application filed April 8, 1873.

*To all whom it may concern:*

Be it known that we, GEO. WILSON and GEO. H. BAISLEY, of Hamilton, county of Caldwell and State of Missouri, have invented certain new and useful Improvements in Boring-Machines, of which the following is a specification:

The nature of our invention relates to an improvement in boring-machines; and consists in, first, independent mechanism for raising the boring-tool, which may be operated by hand, or which may be thrown in gear with the driving mechanism, as may be desired; second, in hinged boxes, in which the boring-shaft is hung so that it may be thrown out of gear for the purpose of raising the tool from the hole; and, third, in the general arrangement and combination of parts, which will be more fully set forth hereafter.

Figure 1:
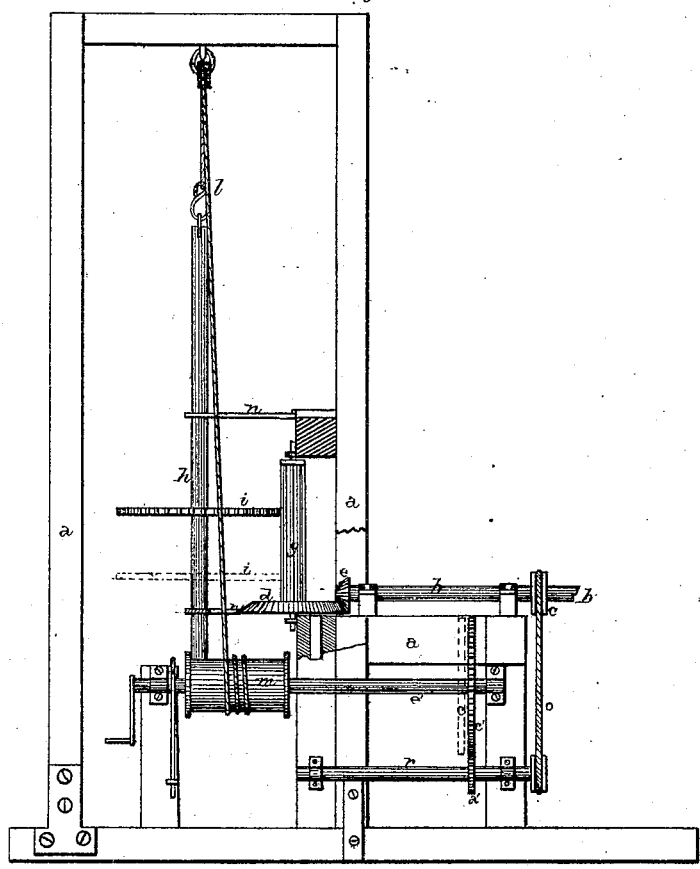
Figure 2:
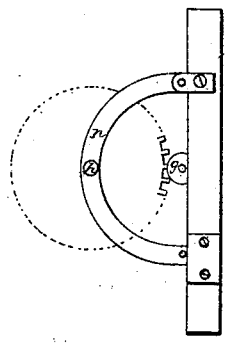

Figure 1 is a side elevation of our invention. Fig. 2 is detached view of the boxes.

$a$ represents the frame, which may be of any desired shape or kind. The driving-shaft $b$, which may be operated by any suitable power, has a grooved pulley, $c$, secured to its outer end, and a beveled pinion, $e$, to its inner one, which meshes with, and imparts motion to, the large driving-wheel $d$. Upon the top of this wheel is a long pinion, $g$, made in any suitable manner, and which, engaging with the spur-wheel $i$ on the boring-shaft $h$, operates the auger or drill for boring. This boring-shaft plays vertically up and down in its bearings, so that the auger can be raised from or lowered into the well, and has the elevating rope or chain $l$, from the drum $m$, secured to its top for this purpose. The boxes or journals $n$, in which the shaft is hung, consist of segments of a circle, and are pivoted at one end, so that they can be swung back, so as to throw the boring-shaft out of gear with the driving mechanism, while it is being drawn up, so as to clear the auger. Passing over the pulley $c$, on the main driving-shaft, is a cord or belt, $o$, which imparts motion to a shaft, $r$, having secured to it a pinion, $a'$. This pinion engages with a spur-wheel, $c'$, on a shaft, $e'$, placed just above it, said shaft having the drum $m$ secured to it, and made to move endwise, so that it can be thrown in and out of gear with the pinion. This end movement may be effected in any suitable manner, the devices by which it is done being immaterial. To the end of the shaft is secured a crank, so that the drum may be operated to raise or lower the auger by hand should the driving mechanism not be in motion; but when in motion, by moving the wheel $c'$ in gear with the pinion, the drum will be operated by it.

Having thus described our invention, what we claim, and desire to secure by Letters Patent, is—

1. The hinged boxes or journals $n$ for throwing the boring-shaft out of gear with the driving mechanism, substantially as shown and described.

2. The elevating mechanism, consisting of the shaft $e'$, drum $m$, and wheel $c'$, when arranged, substantially as described, so that it can be operated either independently of, or in connection with, the driving mechanism, for raising and lowering the boring-shaft, substantially as specified.

3. The shaft $b$, pinions $e$ $g$, and wheel $d$, in combination with the shaft $h$ and spur-wheel $i$, substantially as set forth.

In testimony that we claim the foregoing as our invention we hereunto affix our signatures this 24th day of March, 1873.

GEO. WILSON.
GEO. H. BAISLEY.

Witnesses:
H. FARABEE,
O. B. RICHARDSON.